Figure 1:
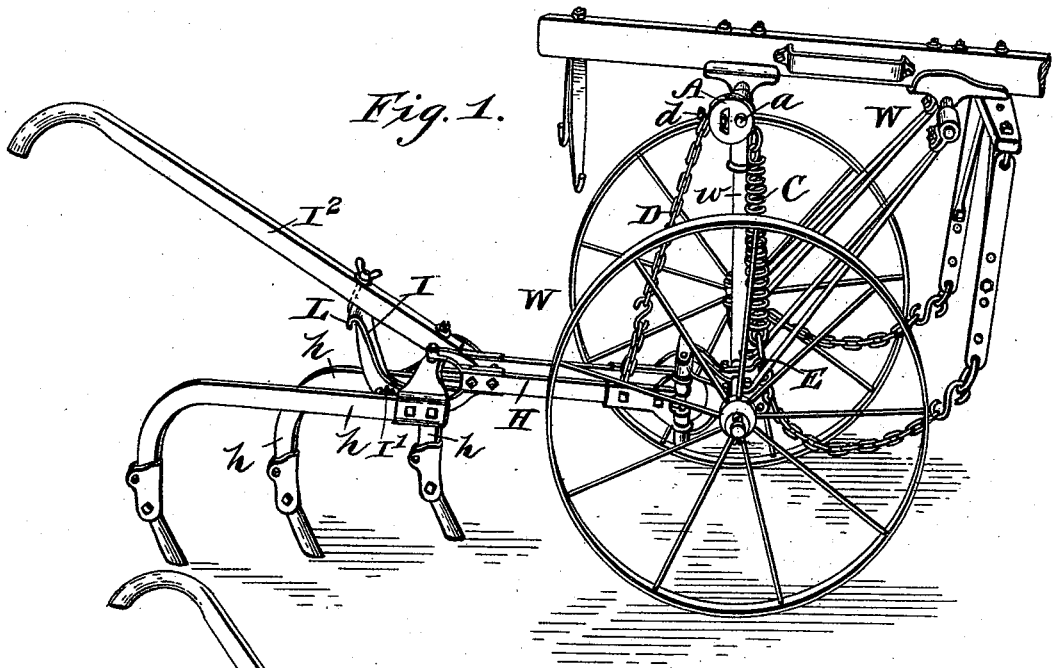

(No Model.) 2 Sheets—Sheet 1.

N. P. LEHR & J. H. WOLFE.
SULKY PLOW.

No. 494,530. Patented Mar. 28, 1893.

Witnesses

Inventors
Nicholas P. Lehr
James H. Wolfe
by
J. J. F. Johnson
Attorney (No Model.) 2 Sheets—Sheet 2.
N. P. LEHR & J. H. WOLFE.
SULKY PLOW.
No. 494,530. Patented Mar. 28, 1893.
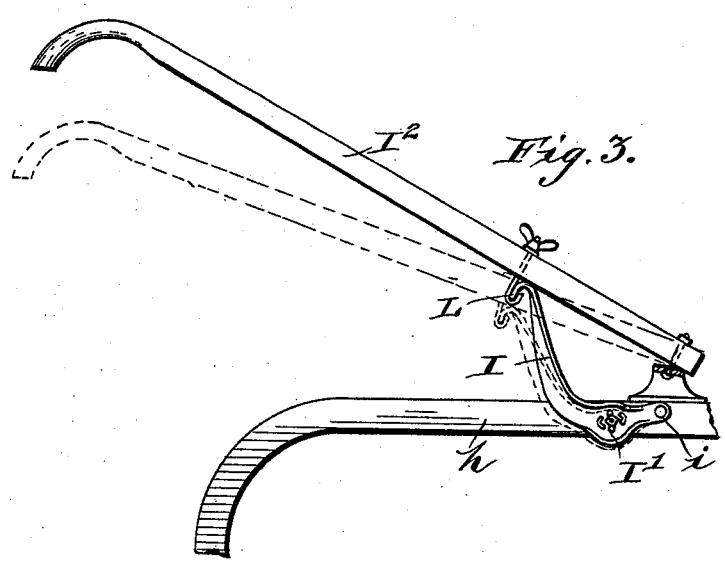
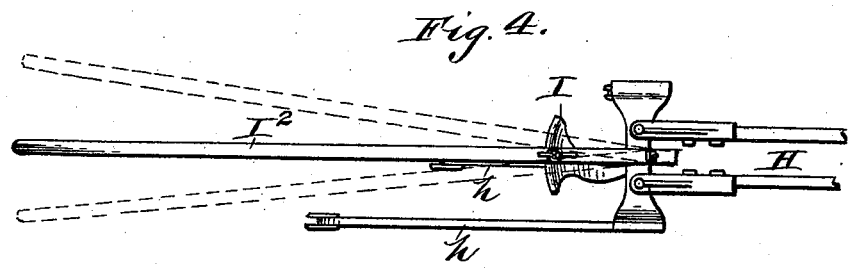
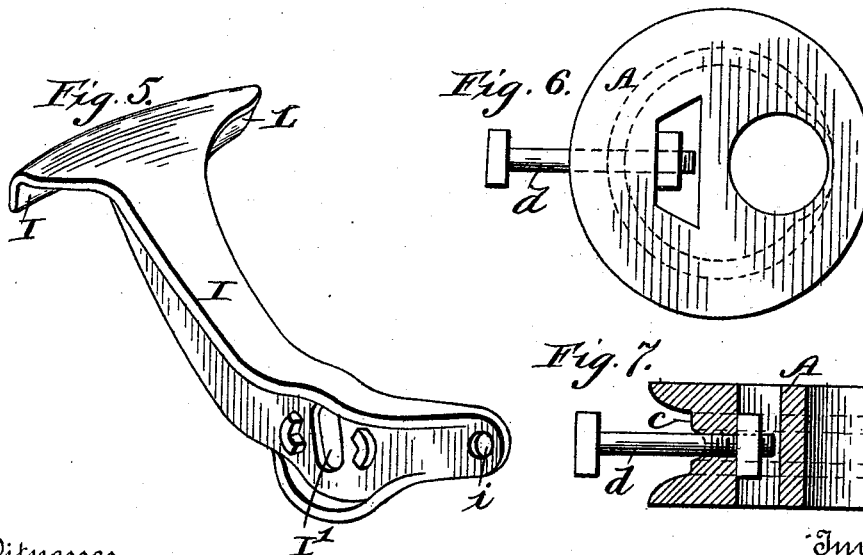
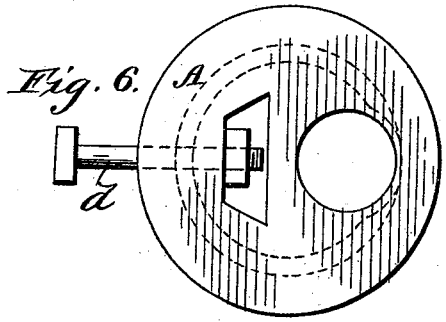
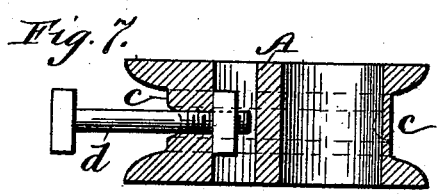
Witnesses
Severance
C. Calvert Hines
Inventors
Nicholas P. Lehr
James H. Wolfe
by T. F. Johnson
Attorney

UNITED STATES PATENT OFFICE.

NICHOLAS P. LEHR AND JAMES H. WOLFE, OF FREMONT, OHIO.

SULKY-PLOW.

SPECIFICATION forming part of Letters Patent No. 494,530, dated March 28, 1893.

Application filed October 29, 1892. Serial No. 450,358. (No model.)

*To all whom it may concern:*

Be it known that we, NICHOLAS P. LEHR and JAMES H. WOLFE, citizens of the United States, residing at Fremont, in the county of Sandusky and State of Ohio, have invented certain new and useful Improvements in Sulky-Plows; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in wheel cultivators, and has for its object the provision of a lift or holder for the drag or handle bars of the cultivator, whereby the said handle bars may be easily raised and held out of contact with, or off the ground when it is desired to turn at the ends of the rows, or to travel from place to place with the cultivator, and it is so constructed and arranged that when the drag or handle bars are raised they will be held off the ground without being swung upon the rack usually attached to cultivators of this character for that purpose.

The invention further has for its object the provision of a suitable handle holder, or bracket whereby the handles of the cultivator can be readily adjusted either laterally or up and down, as desired, for the purpose of accommodating a tall or short operator, as may be convenient, or the condition and character of the ground to be cultivated might require.

The invention further consists in the novel construction and arrangement of parts hereinafter described, illustrated in the drawings, and more particularly pointed out in the claims hereunto appended.

Figure 2:
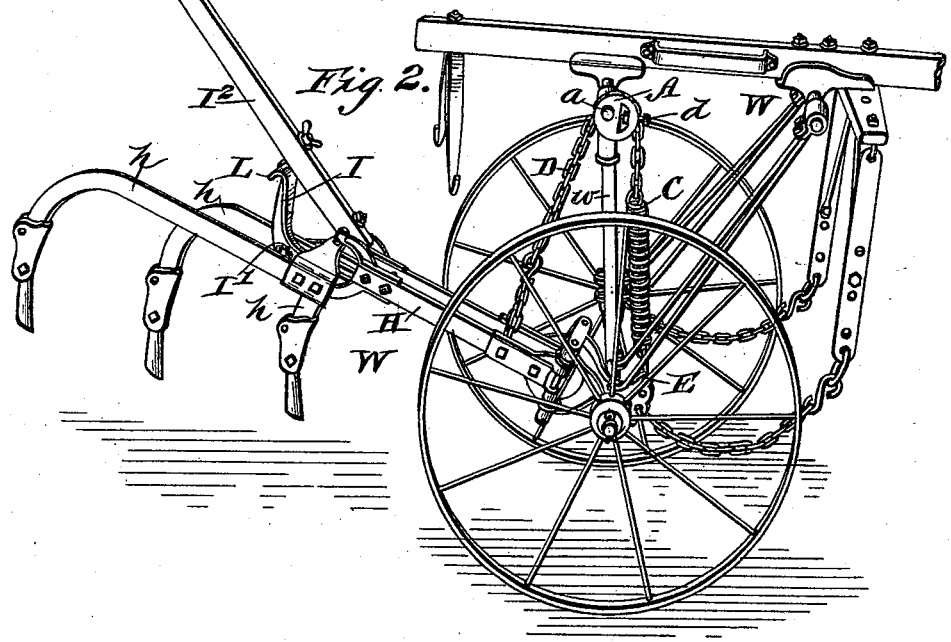

Referring to the drawings, Figure 1 is a view of a cultivator with our improvements attached thereto, the drag-bars being shown down. Fig. 2 is a similar view to Fig. 1 with the drag-bars in an elevated position. Figs. 3, 4, 5, 6 and 7 are detached and detail views of the several parts of our improved lifting and handle adjusting devices.

Similar letters of reference indicate corresponding parts in all the figures where they occur.

W represents a cultivator, and $w$ the upright or vertical portion of the axle, at the upper end of which is bolted or otherwise secured a bearing $a$.

A is a pulley and is provided with a bore or circular opening extending through it. This bore is situated to one side of the diameter and near the circumference of the said pulley, as shown in the drawings. This pulley is provided with a circumferential groove $c$, into which is rigidly secured in any suitable manner a pin or bolt $d$, for a purpose hereinafter described. The pulley A is loosely secured upon the bearing $a$ in any suitable or convenient manner, and works and sets eccentrically thereon, as shown.

C is a coil spring secured at its lower end to a clevis, or otherwise, fastened on the lower horizontal portion of the axle of the cultivator, as shown at F, and at its upper end to a chain that passes over the pulley A and rests in the said groove therein.

D is a chain or other suitable means secured to the upper end of the spring C, passing over the pulley A, to which it is secured by means of the pin or bolt in the groove $c$, down to the drag bar of the cultivator to which it is secured in any suitable manner. The pulley A has a slot near its circumference into which the end of the pin $d$ projects, thus allowing a nut to be screwed upon the end of the said pin $d$, if desired.

It will be observed that when the drag bars are lowered the spring is at its greatest tension, so that it assists somewhat in raising the drag bars from the ground. It will be seen that by raising the ends of the drag bars a short distance the eccentric revolves beyond the center of its bearing, when the spring will have sufficient leverage to hold the drag bars suspended, as is evident.

H represents the drag bar of the cultivator to which are rigidly secured the bars $h$ on which the shovels are fastened. The handle $I^2$ is also secured to the drag bars H, as shown.

I represents a handle holder or bracket which is curved or elbowed, as shown in the drawings. In the lower or front portion of this bracket is a bolt hole $i$ for securing the said bracket to one of the bars $h$. At the curve or bend of this bracket is an oblong slot $I'$. This slot is for the purpose of permitting the bracket to be adjusted up or down, when it is desired so to do. The upper end of this bracket has a flared, flanged portion L, for engagement with a hooked bolt secured to one of the handles of the cultivator, and holds the same rigidly thereto. By means of this flared, flanged portion the handle can be adjusted laterally by loosening the nut, moving the handle laterally in the direction desired, and then tightening the nut when the handle is in the proper position. It will thus be seen that by means of this bracket the handle can be adjusted up and down, or laterally, or both, if desired.

Having described our invention, what we claim, and desire to secure by Letters Patent of the United States, is—

1. In a cultivator a lifting device for the drag-bars consisting of a spring, chain secured thereto, an eccentric pulley having a groove therein, and a bearing upon which the said eccentric pulley rotates, all arranged for operation as specified.

2. In a cultivator a lifting device for the drag bars consisting of a spring, chain secured thereto, an eccentric pulley having a groove therein, a pin in said groove for holding the chain, and the bearing upon which the said eccentric rotates, all arranged for operation as specified.

3. In a cultivator a handle holding and adjusting device consisting of a bracket curved or elbowshaped having an elongated slot at the said curved or elbowshaped portion, a flared or broadened or flanged upper portion, and a hole for a pivot bolt in its forward end, as set forth.

4. In a sulky plow or cultivator the combination of the drag bars with an adjusting device consisting of a bracket curved or elbowshaped having a slot at the curved or elbowshaped portion, and a flared or broadened and flanged upper end, and a pivot bolt hole in its forward end, whereby the handles can be adjusted either vertically or longitudinally, or both vertically and longitudinally, as set forth.

5. The combination with a cultivator arch and hinged drag-bars of a lifting device consisting of a spring secured to the front of the axle, a chain secured to said spring and to the drag-bar and a pulley eccentrically mounted on the axle, as set forth.

In testimony whereof we affix our signatures in presence of two witnesses.

NICHOLAS P. LEHR.
JAMES H. WOLFE.

Witnesses:
J. B. STAHL,
E. L. BOGUE.